Dec. 21, 1965          J. L. HILTON ETAL          3,225,193
SCINTILLATION DEVICE AND SYSTEM
Filed Feb. 24, 1961                           2 Sheets—Sheet 1
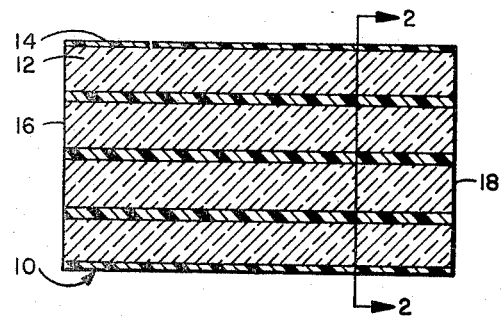
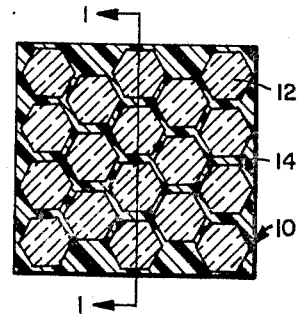
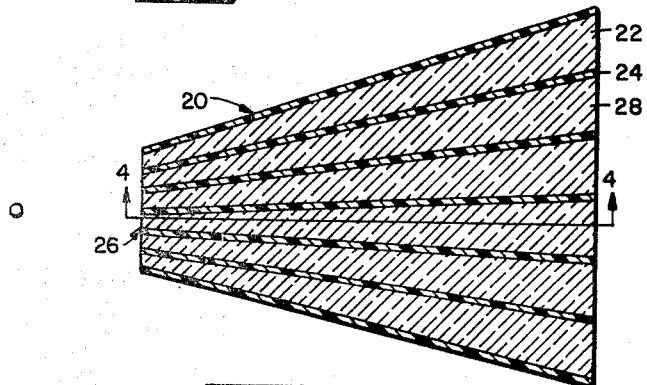
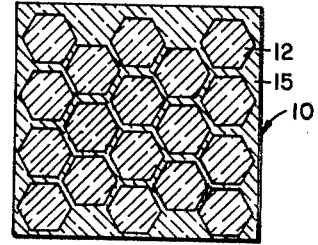
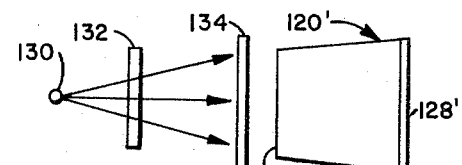
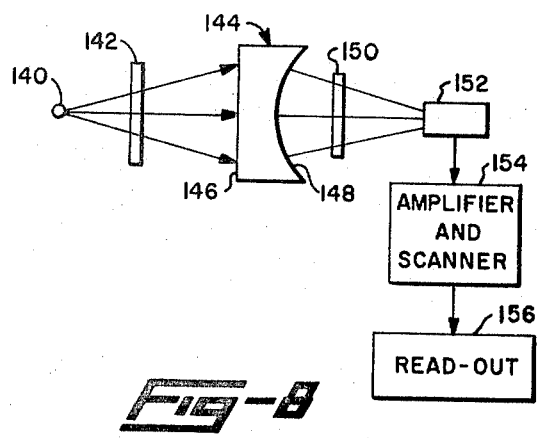
INVENTORS
JOHN L. HILTON
ROBERT K. SQUIRE
BY
*ATTORNEY*

Dec. 21, 1965    J. L. HILTON ETAL    3,225,193
SCINTILLATION DEVICE AND SYSTEM
Filed Feb. 24, 1961    2 Sheets-Sheet 2
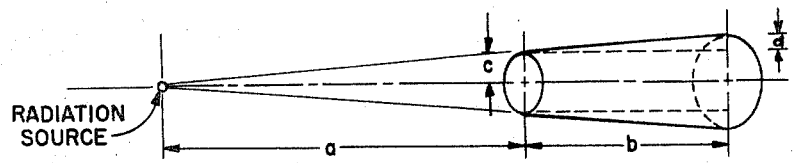
RADIATION SOURCE
*Fig-3a*
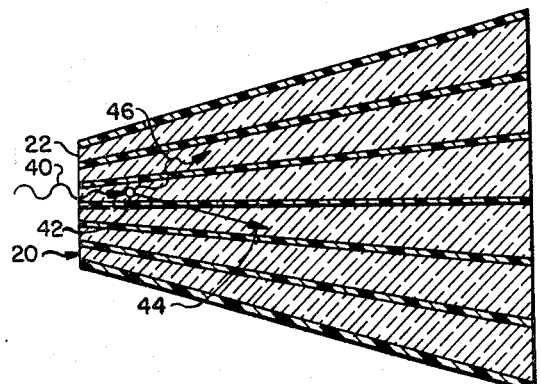
*Fig-4*
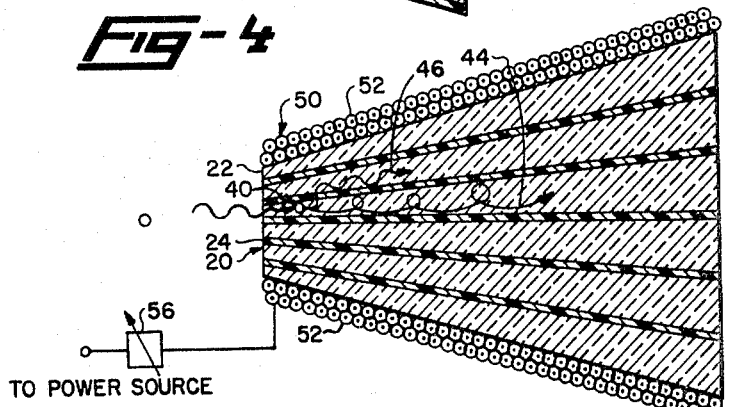
TO POWER SOURCE
*Fig-5*
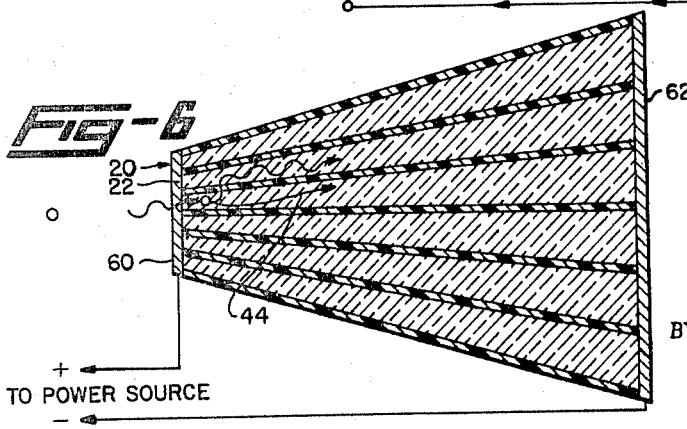
*Fig-6*
TO POWER SOURCE
INVENTOR.
JOHN L. HILTON
ROBERT K. SQUIRE
BY 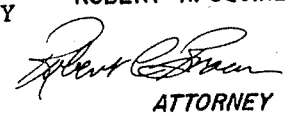
ATTORNEY United States Patent Office 3,225,193
Patented Dec. 21, 1965

3,225,193
SCINTILLATION DEVICE AND SYSTEM
John L. Hilton, Walnut Creek, and Robert K. Squire, Danville, Calif., assignors, by mesne assignments, to Aerojet-General Corporation, El Monte, Calif., a corporation of Ohio
Filed Feb. 24, 1961, Ser. No. 91,516
9 Claims. (Cl. 250—71.5)

This invention relates to systems for a nondestructive testing of materials in general, and particularly to a scintillation device particularly useful in such systems.

Various tests have been devised to determine structural integrity of materials and these can generally be classified as being destructive or nondestructive in nature. Destructive testing, where a sample of the material to be tested is subjected to tests which secure desired information at the expense of destruction of the sample, are fairly well developed. Examples of these tests are tension tests, experimental stress analysis, compression tests, transverse bending tests, shear tests, torsion tests, impact tests, hardness tests, fatigue tests, wear (abrasion) resistance tests, creep tests, and many others. Such tests are enumerated by way of example at Section 90, "Mechanical Testing Equipment and Methods," Tool Engineers' Handbook, 2nd Edition, American Society of Tool Engineers, published by McGraw-Hill Book Company, Inc., New York 1959.

On the other hand, nondestructive testing or inspection may be considered as the extension of human ability to detect defective materials through the application of various forms of energy, and is employed to determine the properties or the performance characteristics of the material or workpiece without resorting to destructive testing procedures. Various types of nondestructive tests include the magnetic-particle method, filtered-particle inspection method, electrified-particle inspection method, penetrant inspection methods, ultrasonic testing, eddy-current testing methods, stress analysis, bonded strain gauges, and radiographic methods of inspection.

The present invention is related to the radiographic type of nondestructive testing and an exposition of the prior art may be found in Sections 88-8, et. seq., of said Tool Engineers' Handbook. Essentially, radiography utilizes the shadow pattern resulting from penetrating radiation to determine a material's homogeneity. A source of penetrating radiation is utilized, together with a readout device. Inspection is accomplished by registration of discontinuities in the material on the observing medium and relating them to the material's physical properties. Thicker and denser materials require a stronger penetrating source, while thin, or light alloy materials require a source of less intensity. X-rays and Gamma rays have destructive effects on all materials when heavy exposures are given and particularly on living tissue. When penetrating radiation is used, expensive protective walls of lead or concrete are employed to absorb the dangerous radiation. Fluoroscopy, another widely used method of presenting radiographic images, employs a screen instantly converting some of the radiation to visible light. Fluoroscopy results in a less acceptable inspection because of lower sensitivity to radiation and the grain size of the screen particles which results in lack of contrast. For this reason, the use of fluoroscopy is usually confined to situations where sensitivity of inspection can be sacrificed for rapidity of inspection.

It is therefore the principal object of this invention to provide improved means for nondestructive testing of various materials.

Another object of this invention is to provide improved means for testing of materials by radiographic means which is simple, rapid, inexpensive, and presents less danger of overdosage of radiation to the operator.

Still another object of this invention is to provide improved means for converting radiation into visible photons.

Yet another object of this invention is to provide improved means for qualitatively determining the structural integrity of a sample by a pictorial display of improved resolution and/or sensitivity.

In its principal aspect the present invention comprises a nondestructive test system wherein the sample to be examined is subjected to a high energy radiation source, and an intensive image of the material appears at the back surface of a novel scintillation device. The image is gathered onto the photo-sensitive area of a pickup device which scans an optical image of the scene to be examined and develops an output voltage that varies with the light intensity of successive elements of the image, the output signal being fed to read-out means. The novel scintillation crystal, which converts the kinetic energy of radiation-induced ionizing particles into light (visible photons) is fabricated in a compact arrangement of long, narrow fibers of various shapes, packed or glued with an opaque binder. In an alternate embodiment, the material surrounding the fibers is itself a scintillating phosphor. To obtain superior resolution at close distances, the fibers may be tapered so that the cross section at the front surface of the crystal intercepts the identical solid angle of the radiation source as the back cross section. Electrostatic or electromagnetic focusing may be employed to improve the clarity of the image. In a system where a photographic record of the image is desired, such as with X-rays, the front and back surfaces of the crystal may be polished and/or mirrored, as required.

These and other objects, advantages and features of this invention will be apparent to those skilled in the art from the following description taken together with the appended drawings, wherein:

FIG. 1 is a sectional view of the novel scintillation crystal of the present invention taken along section lines 1—1 of FIGURE 2;

FIG. 2 is a sectional view of the novel scintillation crystal taken along section lines 2—2 of FIGURE 1;

FIG. 2a is a sectional view similar to FIGURE 2, but showing an alternate embodiment where the material surrounding the fibers is itself a scintillation material;

FIG. 3 is a sectional view of a modified version of the novel scintillation crystal, particularly suitable in the system of FIG. 7;

FIG. 3a is a schematic diagram showing the preferred dimensions of the tapered fibers of the embodiment of FIG. 3;

FIG. 4 is a sectional view of the scintillation crystal of FIG. 3 taken along section line 4—4;

FIG. 5 is an identical sectional view of the scintillation crystal of FIG. 3 as modified to employ electromagnetic focusing;

FIG. 6 is an identical sectional view of the scintillation crystal of FIG. 3 as modified to employ electrostatic focusing;

FIG. 7 is a schematic view showing the novel crystal of FIG. 3 utilized in a system for obtaining X-ray pictures of the sample to be tested, in accordance with the present invention; and, FIG. 8 is a block diagram of a nondestructive test system utilizing the novel scintillation detector of the present invention to afford a pictorial representation of the structural integrity of the sample to be tested.

Referring to FIGS. 1 and 2, there is shown the novel scintillation crystal of the present invention. The crystal detector unit 10 comprises a plurality of long, narrow fibers 12 of suitable scintillation materials. Such materials are known in the art and have the ability of converting the kinetic energy of radiation-induced ionizing particles into light (visible photons). Typical materials which possess this characteristic are anthracene, stilbene, naphthalene, p-xylene, titanium activated sodium iodide, tin activated lithium iodide, Europium activated lithium iodide, titanium activated cesium iodide, lithium-magnesium-aluminum silicate glass, and terphenyl plastic. The fibers 12 are closely packed together and bonded on their lateral surfaces with an opaque binder 14, so visible light may be transmitted along the longitudinal axis of each fiber but not across from one fiber to the other. It is understood that any other method of preventing light transfer from one fiber to another may be used, such as, but not limited to the following examples: an opaque screen, metallic or nonmetallic, bonded on both sides to the neighboring fibers; an opaque screen unbonded but located between the fibers; an opaque coating on one fiber which is held to its neighbor by some method other than bonding, such as mechanical pressure; a material between fibers that is not itself opaque but because of the interaction of the interface with the scintillating phosphor, a more complete refraction of the visible light occurs (i.e., an index of refraction lower than the fiber); the surface of one or more fibers is roughened in order to backscatter the visible light. By the construction mentioned above, the light formed by internal scintillation will not transfer from one fiber to another. The crystal will act as a "light pipe," that is, the light will be directed to the end of the fiber.

The cross section of the individual fibers 12 or composite cell 10 can be of any shape, such as round, hexagonal, square, etc. Utilization of hexagonal fibers 12, as shown in FIGS. 1-3, results in a more compact arrangement, providing greater image resolution. However, this is not absolutely essential. The cross sectional area of the fibers is approximately the size of image definition, and is equivalent to grain size in theoretical photography. The smaller the diameter of the fibers, the more area of the "crystal" will be lost to the opaque joints between fibers, causing the scintillation efficiency to decrease. Therefore, the optimum diameter of fiber will be a compromise between resolution, scatter discrimination, and the cross sectional efficiency desired. For perfect use, the center line of each fiber is directed toward the radiation source. Different lengths of fibers may be utilized for each given application. It is preferred that the fibers have a length which is appreciable to that of the average photon path length in the scintillation material so a high photon detection efficiency is realized.

FIG. 2a shows an alternate embodiment wherein the material surrounding the fibers is itself a scintillation material. Improved performance is obtained by use of a scintillation material as a boundary when it is considered that the purpose of the boundary with relation to each fiber is two-fold, that is, (1) to collect as much light from the scintillating event by multiple reflections of the generated light to the detector end, and (2) to maintain image definition by preventing to the extent possible, light generated by scintillation in one area from entering other areas or fibers. We have found that the reflecting nature of the fiber boundary or interface is enhanced by fusing around each scintillation fiber another hollow fiber of a lower index of refraction. This provides an ideal reflective surface for the inner fiber and helps to prevent reflective surface crazing. Normally, light generated by scintillation in the outer fiber will not enter the center fiber unless it passes completely through to emerge from the other side. But if this photon is scattered while passing through the center fiber, it is captured and by multi-reflections emerges from the detector at the end of the center fiber. Some of the light generated in the outer fiber is also reflected down the outer fiber itself. This alternate embodiment becomes important as the cross-sectional area of the outer jacket approaches the cross-sectional area of the center fibers. It is seen that the improvement is significant when a composite crystal or phosphor is made which has 50% of its cross-sectional surface of outer fiber.

FIG. 3 shows a modified version of the novel crystal of this invention which is particularly applicable for close work where the radiation beams are not approximately parallel. Here, the fibers 22 have tapered sides so the identical solid angle of the radiation source is intercepted by both the front surface 26 and the back surface 28 of each fiber 22. For best results, the fibers are oriented so that the end surface of each is directed toward the radiation source. As shown in FIG. 3a, if the point source of the radiation is $a$ inches from the front of the novel scintillation crystal, and the crystal is $b$ inches deep, and the fiber front has a radius of $c$, then the optimum taper $d$ of each fiber is expressed by the equation $d = bc/a$ where $(d+c)$ equals the radius of the back of the fiber. The advantage of the taper will particularly be realized when $a$ is within a factor of 100 or less of $b$. The taper will materially improve the image resolution inasmuch as omission of the taper causes a loss of image resolution of the size $d$. The improvement is realized most when $d$ is significant in size with respect to $c$. It is seen that the angle of taper is optimum for only one source-to-detector distance but this feature materially improves the image resolution at other distances.

Improvement is also obtained by optimizing the length of the crystal to absorb a significant fraction of the incoming penetrating radiation and converting this to visible light without causing objectionable side scatter into neighboring cells. This scatter can be reduced by selecting scintillating phosphors that have the optimum ratio of their energy absorption by pair production, and photo capture, as will later be explained.

If desired, a mirrored surface may be placed on the rear edge 28 for use in the system of FIGURE 7 or front edge 146 of FIGURE 8. When utilizing this novel crystal arrangement of FIGURE 3, the limit of how close the source to detector distance can be will then be a function of source diameter and acceptable penumbra.

The theory of operation of generation of light within the instant scintillation device may be generalized as follows. An incoming photon passes into the phosphor where three kinds of significant events occur. The probability that a scattering event will occur for any single photon is indeterminant but when many photons are involved, such as in the present invention, the average case will approximate the narrow beam conditions and follow the formula $$I = I_0 e^{-\mu x}$$

where $I$ = the intensity of the radiation not scattered or absorbed
$I_0$ = the intensity of the radiation as it enters the absorbing median; in this case the composite phosphor
$\mu$ = the linear absorption coefficient which differs for each material
$x$ = the thickness of the absorber being considered.

If the thickness (i.e., depth) of the absorber, here the novel crystal, is equal to 1 (called the mean free path length), then the portion of the primary X or Gamma radiation that will be absorbed will be approximately 63% of that in the original beam. This fraction represents the maximum fraction of the beam that is used. Since high energy radiography utilizes less than 1% of the primary beam, significant improvement is obtainable with the present invention. The thicker the crystal detector the larger the fraction of the primary beam sampled. The reason why a phosphor thickness of 1 (or thicker) is not sometimes practical, is due to the internal scatter that occurs.

In the simplified model considered here, all of the interactions are assumed to be Compton (i.e., an incoming X or Gamma photon bounces off a phosphor atom in a billiard ball action). The only interaction that is useful is the first collision; most second or third collisions would result in generating light in a position other than the original beam. Thus, second and third scattered photons often produce an undesired fuzzing of the image. Therefore, the thickness of the phosphor must be a compromise between phosphor efficiency and that image definition or fuzziness which can be tolerated.

In reality, Compton collisions are only one of three general mechanisms that generate light within a scintillator. There is also light given off by photo capture, which typically is not important in plastic scintillation. The photo capture light is resulting from the complete capture by the phosphor atom of the primary X or Gamma photon with the energetic ejection of a single electron, which has almost equal probability of leaving the excited atom in any direction. This photo electron causes light to be generated all along its path which can be down or across the crystal fibers. Since any light generated across fibers tends to lose image definition, fiber dimensions will be a careful compromise when significant photo capture is occurring and a small diameter fiber is desired.

The third type of capture or scatter mechanism that has importance to the present invention is pair production. This occurs only in high energy X or Gamma rays. The incoming primary X or Gamma photon interacts with the nucleus of the phosphors atom causing the ejection of a positive and negative Beta particle. However, both of these particles which generate light along their paths are directed, generally, in a narrow beam along the fiber, thus generating light mostly within the small desired area.

For the device illustrated in FIGS. 1, 2 and 3, to be most efficient and yet maintain good image definition a high density (as compared to the scintillation) material such as lead, tungsten, steel or aluminum can be inserted between the fibers. This high density material will tend to absorb the Compton electrons, the photo-electrons and the Beta particles that try to cross from one fiber to the other. This tends to give a sharper image for any given phosphor thickness.

We have also found that other means may be utilized to assure the retention of Compton, photoelectric, and pair production electrons and Beta particles within the desired fiber. For example, electromagnetic or electrostatic focusing may be employed to prevent degeneration of image clarity brought about when ionizing particles across fiber interfaces. When an electron is ejected from the phosphor atoms by the action of the primary radiation, it is desired to have the whole path length of this charged particle within the single fiber where the event occurred. FIG. 4 is a sectional view of the scintillation crystal 20 of FIG. 3 taken along section line 4—4 and shows schematically what may happen where undesirable cross-over occurs. The incoming radiation 40 collides with a phosphor atom 42 within a fiber 22 causing the atom 42 to eject an electron 44 as well as scattered radiation 46. To decrease the number of charged, and therefore ionizing particles that cross fiber interfaces, the means illustrated in FIGS. 5 and 6 may be employed.

As shown in FIG. 5, a magnetic coil 50, comprising a plurality of wires 52, may be wound about the composite fiber bundle 20 so that a strong magnetic field is set up such that the lines of force pass down the length of the fibers 22. Thus any charged particles 44 with a component of velocity other than in an axial direction will experience a force tending to spiral the charged particle around the point of origin in a helix. By adjusting the strength of the magnetic field, through means such as the variable impedance 56, any desired clarity of image may be obtained.

Electrostatic focusing is employed in the embodiment shown in FIG. 6. By placing capacitor plates 60, 62 across the ends of the composite crystal 20 where the fibers 22 terminate and applying a D.C. electric potential to the plates from a power source (not shown), an electrostatic field will be set up along the axis of each fiber 22. Of course, the capacitor plate on the end of the crystal adjacent the pickup device, such as the image orthicon to be described in the system of FIG. 8, must be transparent. Any electron 44 or beta particle with a component of velocity in any direction other than axial will experience a force tending to change the path from a straight line to a parabola, thus increasing the likelihood of more scintillation light in the desired area.

It is to be understood that electrostatic or electromagnetic focusing may be employed with any of the embodiments shown herein, and that these techniques are not limited to the embodiment of FIG. 3.

In those instances where opaque regions of the crystal 20 are not desired to be reproduced on the readout, the crystal fibers 22 may be vibrated or moved during the exposure time to wash out the hexagon pattern.

While the above is believed to be a correct explanation of the principles underlying applicant's invention, further investigation may lead to a modification of this theory. It is to be understood, of course, that the invention is independent of any theory which may be advanced to account for the results obtained.

FIG. 7 illustrates a system wherein the unique crystal detector of this invention is used as an X-ray film intensifier (wave shifter). The object 132 to be examined is placed between an X-ray radiation source 130 and the novel detector 120' of FIGURE 3. An X-ray film plate 134 is arranged adjacent to the front surface 126' of the crystal 120' by any conventional means. The front surface 126' is finished to give maximum light coupling to the film with the rear surface 128' being mirrored to reflect back all the light to the film. Thus X-rays from the source 130 are propagated through the specimen 132 into the crystal 120' through the front surface 126' and converted to visible light in the fibers 122 and the visible light is reflected from the mirrored surface 128' wherein the visible light is propagated back through the fibers to form an image on the negative plate 134.

FIGURE 8 illustrates in diagrammatic form an improved nondestructive test system employing the novel scintillation detector of this invention. This system is operable to provide an image of the specimen structure having great detail in less exposure time thus providing reduced risk to the well-being of the system operator and other radiation sensitive materials. The specimen 142 to be tested is arranged between a radiation source 140 and a scintillation detector 144 of the type described, having a mirrored front surface 146 and a rear edge fabricated to form a concave or light diverging surface 148. Typical radiation sources are natural gamma sources, or X-rays from electrons accelerated into a target. A light gathering means 150, such as a lens, or light pipes, is arranged behind the rear surface 148 in a manner whereby the light converges on the photosensitive area of a pickup tube 152.

The light gathering device serves to efficiently remove the visible image from the scintillation fibers. Any one of many methods may be used. The detector can be fabricated so that the image is formed on the rear surface by roughing the surface, adding a thin translucent sheet of material on which the image will be formed and the light recorder focused directly on the formed image. This can also be done by continuing each fiber in a single or multiple light pipe that has no effective scintillating capacity. This light pipe can be curved or distorted, if desired, to turn corners and/or pass behind a radiation shield where the visible image can be transferred to film or a photoelectric pickup, such as a film or television camera. The non-scintillating light pipes can also be tapered to reduce or increase the image from a large phosphor up or down to a more convenient size for the visible light detector. Thus, with this system only one optical interface is needed in the visible light path from the phosphor where the light is generated to the surface of the light detector. In the case of a photoelectron type pickup, such as a lumacon or image converter, or image orthicon, etc., the light pipe can be used at the termination as the face plate upon which the photosensitive surface is plated.

In the instant system, the visible light generated in each fiber is "light piped" to the detector end and is there directly coupled to a non-scintillating light pipe which demagnifies as required and applies the visible image to the face of the pickup tube. In this manner, a large percentage of the scintillation generated light is delivered to the pickup device. Conventional methods, such as that illustrated in Patent Number 2,902,604 to Baldwin, can collect only a small fraction of the scintillation generated light. Assuming a camera lens diameter of one inch and a distance of 36 inches from the TV camera and the phosphor described in the Baldwin patent, it is calculated that the Baldwin system will collect approximately 1/1000 of the light generated by scintillation. On the other hand, it is conservatively estimated that the instant system claimed herein will collect 1/4 of such light. Further, the image resolution will be improved for very small fibers of the present invention, since the fiber interfaces tend to reduce light generation except in the direct beam of the primary X or gamma rays. Taper of the fibers also aids image resolution, as explained supra.

Although the system described in connection with FIGURE 8 utilizes an image orthicon, any pickup device which will scan an optical image of the scene to be examined and develop an output signal that varies with the light intensity of successive elements of this image may be used in place of the image orthicon. A full discussion of image orthicons and other television camera tubes will be found at pages 981, et seq., of "Electronic and Radio Engineering," by F. E. Terman, McGraw-Hill Book Company, Inc., New York, fourth ed., 1955.

The distinctive functions of the image orthicon which are significant in the operation of this system, and which are well known in the art are described as follows: Photons falling on a photo-sensitive cathode cause electrons to be admitted; these are accelerated into a thin dielectric material (such as glass) where by secondary emission a local positive charge is generated; with arrival of other photons the charge density is intensified. This integrated charge is then read off by an electron sweep. Since the electron sweep can be triggered at will, the repetition rate is selected at a low enough value to let the charge on the dielectric material build up to an intensity strong enough to be read accurately. The electron sweep is amplified and then examined by any of several means. It is possible to program the pickup tube output signal directly to a permanent writing oscilloscope.

Non-linear electronic elements can be introduced to over intensify strong or weak portions, if desired. Thus, if recorded photons in any one area of the material under examination are greater than statistically expected, a non-linear circuit may be used to accentuate this deviation for ease of recognition. Direct recording of the data can be taken for later analysis by a computer or otherwise. Trigger circuits can be directly driven from the scanning signal for any desired function. Such means are well known in the art, and are not described, as individually they do not form a part of this invention.

Where a television output tube is used as the readout device, a visible black and white (or colored image where the color change represents photon energy change when the radiation source is swept through different energies) is available to the operator at a remote location, affording an opportunity to view the structural integrity of the sample. The system just described has a particular advantage over the radiographic photo exposure type system in that pictorial readout is obtained concurrently with exposure. As shown in FIGURE 8, the output of the image orthicon 152 is coupled to the necessary amplification and scan circuitry 154, the output of which is fed to a readout device 156. Previous scanning methods using individual photo-sensitive pickup tubes provided an output signal proportional to the quantity of photons observed at one single location. The operator was required to determine from the quantitative data, the structural condition of the sample. With the present invention it is possible to directly view the structural integrity of the sample without the intermediate step of deriving the condition from the quantitative data obtained, that is, a direct qualitative determination may now be made, and in a much reduced time.

While a number of details of construction and alternate embodiments have been illustrated and described, alternatives and equivalents will occur to those skilled in the art which are within the scope in spirit of this invention. It is therefore desired that the protection be not limited to the details herein illustrated and described, but only by the proper scope of the appended claims.

What is claimed is:

1. In combination, a plurality of closely packed long, narrow scintillation fibers having lateral and end surfaces, means for holding said fibers together on their lateral surfaces to form a honeycombed scintillation crystal, and means associated with said plurality of fibers for generating an electric field having lines of force along the axis of each fiber.

2. A device as described in claim 1 wherein said electric field generating means comprises means for generating an electromagnetic field.

3. A device as described in claim 1 wherein said electric field generating means comprises means for generating an electrostatic field.

4. In combination: a plurality of closely packed, tapering, long, narrow scintillation fibers having lateral surfaces and front and rear end surfaces; a material filling the interstices between said fibers and holding said fibers together on their lateral surfaces; light gathering means coupled to the rear end surfaces of said fibers; and means associated with said plurality of fibers for generating an electric field having lines of force along the axis of each fiber.

5. A nondestructive test system comprising: a scintillation converter adapted to receive radiation from a radiation source, light gathering means directly coupled to said converter, an electronic scanning means having a signal output associated with said light gathering means, and means for converting said scanning means signal output to a visible readout, said converter comprising a plurality of closely packed, long, tapered, narrow scintillation fibers having lateral and end surfaces and a material holding said fibers together on their lateral surfaces to form a honeycomb scintillation crystal.

6. A device as described in claim 5 wherein said holding material comprises a scintillation material having a lower index of refraction than said tapered fibers.

7. A device as described in claim 5, and in addition means associated with said plurality of fibers for generating an electric field having lines of force along the axis of each fiber.

8. A nondestructive test system comprising: a scintillation converter adapted to receive radiation from a radiation source, light gathering means directly coupled to said converter, an electronic scanning means having a signal output associated with said light gathering means, and means for converting said scanning means signal output to a visible readout, said converter comprising a plurality of closely packed, long, narrow fibers having lateral and end surfaces, an opaque binder material holding said fibers together on their lateral surfaces to form a honeycomb scintillation crystal, said fibers being tapered along their longitudinal axis increasing in dimension at a linear slope from their front to rear end surfaces, whereby the cross section of any fiber at its front end surface intercepts the identical solid angle from the radiation source as the cross section at its rear end surface.

9. In combination: a plurality of closely packed long, narrow scintillation fibers having lateral and end surfaces, said fibers being tapered along their longitudinal axis and increasing in dimension at a linear rate from their front to rear end surfaces, means interspersed between said fibers for preventing the transfer of light energy from any one fiber to another, and means associated with said plurality of fibers for generating an electric field having lines of force along the axis of each fiber.

References Cited by the Examiner

UNITED STATES PATENTS

| | | | |
|---|---|---|---|
| 2,772,368 | 11/1956 | Scherbatskoy | 250—71.5 X |
| 2,825,260 | 3/1958 | O'Brien | 88—1 |
| 2,911,534 | 11/1959 | Brannon et al. | 250—71.5 |
| 2,920,204 | 1/1960 | Youmans | 250—71.5 X |
| 2,986,635 | 5/1961 | Schultz | 250—71.5 |
| 2,992,587 | 7/1961 | Hicks et al. | 88—1 |
| 3,032,657 | 5/1962 | Meier et al. | 250—71 |
| 3,058,021 | 10/1962 | Dunn | 250—227 X |

OTHER REFERENCES

On Plastic Scintillation Phosphors: by Kloepner et al. from Review of Scientific Instruments, volume 23, No. 8, August 1952, pages 446 and 447.

Recent Advances in Theory of Scintillation Phosphors: by Swank, from Nucleonics, volume 12, No. 3, March 1954, pages 14 to 19.

RALPH G. NILSON, *Primary Examiner.*

ARCHIE R. BORCHELT, *Examiner.*